(12) United States Patent
Ikuta et al.

(10) Patent No.: US 11,640,073 B2
(45) Date of Patent: May 2, 2023

(54) EYEGLASSES

(71) Applicant: YAMAMOTO KOGAKU CO., LTD., Higashiosaka (JP)

(72) Inventors: Minoru Ikuta, Higashiosaka (JP); Tomoyuki Fukuyama, Higashiosaka (JP)

(73) Assignee: YAMAMOTO KOGAKU CO., LTD., Osaka (JP)

( * ) Notice: Subject to any disclaimer, the term of this patent is extended or adjusted under 35 U.S.C. 154(b) by 218 days.

(21) Appl. No.: 17/003,453

(22) Filed: Aug. 26, 2020

(65) Prior Publication Data

US 2021/0072558 A1 Mar. 11, 2021

(30) Foreign Application Priority Data

Sep. 6, 2019 (JP) .............................. JP2019-162676

(51) Int. Cl.
*G02C 5/14* (2006.01)
*G02C 5/12* (2006.01)

(52) U.S. Cl.
CPC ................. *G02C 5/14* (2013.01); *G02C 5/12* (2013.01); *G02C 2200/08* (2013.01)

(58) Field of Classification Search
CPC ..................................... G02C 5/14; G02C 5/16
USPC .......................................................... 351/123
See application file for complete search history.

(56) References Cited

U.S. PATENT DOCUMENTS

| | | | | |
|---|---|---|---|---|
| 3,944,344 A | * | 3/1976 | Wichers | .................... G02C 5/16 351/110 |
| 5,631,718 A | * | 5/1997 | Markovitz | ............. G02C 3/003 351/111 |
| 9,188,795 B1 | * | 11/2015 | Chin | ......................... G02C 5/16 |
| 2013/0208231 A1 | | 8/2013 | Chen Chang et al. | |
| 2014/0078463 A1 | * | 3/2014 | Tsai | ....................... G02C 5/143 351/123 |
| 2015/0185499 A1 | * | 7/2015 | Yang | ..................... G02C 5/143 351/119 |

(Continued)

FOREIGN PATENT DOCUMENTS

| | | |
|---|---|---|
| JP | H10513279 A | 12/1998 |
| JP | 3081261 U | 8/2001 |
| JP | 2016151752 A | 8/2016 |

(Continued)

OTHER PUBLICATIONS

Office Action issued in Japanese Patent Application No. 2019162676 dated Feb. 27, 2023.

*Primary Examiner* — Darryl J Collins
(74) *Attorney, Agent, or Firm* — Heslin Rothenberg Farley and Mesiti PC; Nicholas Mesiti (57) ABSTRACT

Provided are eyeglasses that can be supported so as to fit each of various head shapes of wearers without any gap, are extremely excellent in preventing slippage and falling during exercise, have a good fitting feeling, and do not particularly require an adjustment operation for preventing slippage and falling. The eyeglasses include a frame, end pieces attached to both end portions of the frame, and temples attached to the back ends of the end pieces so as to be swingable in the inward and outward directions, and a temple pad protrudes from the front end of the temple. The temple pad moves inward when the temple swings outward, and the temple pad moves outward when the temple swings inward.

7 Claims, 7 Drawing Sheets

(56) References Cited

U.S. PATENT DOCUMENTS

2017/0115505 A1* 4/2017 Odom .................. G02C 5/14
2021/0311323 A1* 10/2021 Uchida ................ G02C 5/143

FOREIGN PATENT DOCUMENTS

JP    2016151761 A    8/2016
JP       6413052 B   10/2018

* cited by examiner

EYEGLASSES

CROSS REFERENCE TO RELATED APPLICATIONS

This application is a U.S. Patent Application filing which claims priority to Japanese Application No.: 2019-162676, filed on Sep. 6, 2019, which is hereby incorporated by reference herein in its entirety.

BACKGROUND OF THE INVENTION

Field of the Invention

The present invention relates to eyeglasses suitable for use as sunglasses for sports such as baseball, tennis, athletics, and the like.

Description of the Related Art

Conventional eyeglasses include a front and temples extending backward from both end portions of the front, and each of the temples is provided with a first temple in contact with the head of a wearer and a second temple that interconnects the first temple and the front. In the eyeglasses, the first and second temples are rotatably connected with a hinge, and the hinge has a pin and connects the back end of the second temple to the center section of the first temple. A rotation point is provided in the hinge connection, and thereby, the first temple rotates around the rotation point (National Publication of International Patent Application No. 1998-513279).

When the conventional eyeglasses as thus configured are placed on the head of the wearer, the first temple moves adjustably to fit the shape or size of the head of the wearer. This adjustable movement is achieved without the need for the wearer to manually adjust the temples. Therefore, the eyeglasses sufficiently fit a wide variety of head shapes or sizes.

Further, there are conventional eyeglasses provided with a frame including a front and a temple, where a cheekbone pad for supporting the cheekbone is movably attached to the temple, and the position of the cheekbone pad is adjustable (Japanese Patent No. 5243454).

In the conventional eyeglasses having such a configuration, the cheekbone pad supports a downward rotational moment applied to the eyeglasses with the cheekbone, and the position of the cheekbone pad is adjustable. Hence the eyeglasses can be freely adapted in accordance with the size of the face of the wearer and can, furthermore, contact a suitable position of the cheekbone of the wearer to exert an accurate and stable fixing force, so that even when a force is applied from another side, the positional deviation is prevented.

SUMMARY OF THE INVENTION

There is a demand for sport sunglasses having a good fitting feeling and a structure free from slippage and falling during exercise. The demand is more prominent especially in games such as baseball and tennis where the movement is instantaneous and in jump games such as long jump and high jump where the movement is intense.

The head of the eyeglass wearer varies not only in size (perimeter) but also in shape. As the shape of the head viewed from above, there are various shapes such as a shape in which the back of the head is thin and the side of the head is relatively wide (hereinafter referred to as an egg shape), a shape in which the back of the head is wide and the side of the head is thin (hereinafter referred to as an inverted egg shape), a shape in which the back and side of the head are generally thin, and a round shape.

However, in the eyeglasses described in National Publication of International Patent Application No. 1998-513279 above, although the first temple moves adjustably to fit the shape or size of the head of the wearer, it cannot be said that the eyeglasses can fit each of various head shapes of eyeglass wearers because a fitting feeling changes or slippage occurs due to the placement position of the first temple being at the front, back, or center part of the ear and because the first temple only rotates.

In the eyeglasses described in Japanese Patent No. 5243454 above, since the cheekbone pad is movably attached to the temple and the position of the cheekbone pad is adjustable, the eyeglasses can be said to be superior to the eyeglasses described in National Publication of International Patent Application No. 1998-513279 in preventing slippage and falling since simultaneously supporting the side of the head and the cheek of the wearer.

However, in the eyeglasses described in Japanese Patent No. 5243454 above, even though the position of the cheekbone pad is adjustable, the position can be adjusted only in the longitudinal direction of the temple and cannot be adjusted in the width direction of the temple. Hence it cannot be said that the eyeglasses can fit each of various head shapes of eyeglass wearers. In addition, the cheekbone pad needs to be adjusted by a user loosening or tightening a screw, and an operation for the adjustment is troublesome.

Therefore, it is an object of the present invention to solve the above conventional problems and to provide eyeglasses that can be supported so as to fit each of various head shapes of wearers without any gap, are extremely excellent in preventing slippage and falling during exercise, have a good fitting feeling, and do not particularly require an adjustment operation for preventing slippage and falling.

The eyeglasses of the present invention include a frame 1, end pieces 2 attached to both end portions of the frame 1, and temples 3 attached to the back ends of the end pieces 2 so as to be swingable in the inward and outward directions. A temple pad 4 protrudes from the front end of the temple 3. The temple pad 4 moves inward when the temple 3 swings outward, and the temple pad 4 moves outward when the temple 3 swings inward.

In the eyeglasses of the present invention, a loosely fitting portion 31 is provided at the front-end portion of the temple 3, a protrusion 21 provided at the back end of the end piece 2 is loosely fitted to the loosely fitting portion 31, and the swinging of the temple 3 is restricted by the contact of inner and outer sidewalls 21*a*, 21*b* of the protrusion 21 with inner and outer sidewalls 31*a*, 31*b* of the loosely fitting portion 31.

In the eyeglasses of the present invention, the temple pad 4 is detachably attached to a mounting portion 33 provided on a support 34 protruding from a front end of the temple 3.

In the eyeglasses of the present invention, a nose pad 5 is attached to the frame 1 or a lens L attached to the frame 1.

In the eyeglasses of the present invention, the end piece 2, the temple 3, and the support 34 protruding from the front end of the temple 3 have flexibility.

With the eyeglasses of the present invention being configured as described above, the eyeglasses can be supported so as to fit each of various head shapes of wearers without any gap, are extremely excellent in preventing slippage and falling during exercise, and have a good fitting feeling.

Further, the eyeglasses of the present invention can fit each of various head shapes of wearers without any gap simply by being worn on the head, and hence the eyeglasses do not particularly require an adjustment operation for preventing slippage and falling.

DETAILED DESCRIPTION OF THE PREFERRED EMBODIMENT

Hereinafter, an embodiment of the eyeglasses of the present invention will be described in detail with reference to the drawings.

Figure 1:
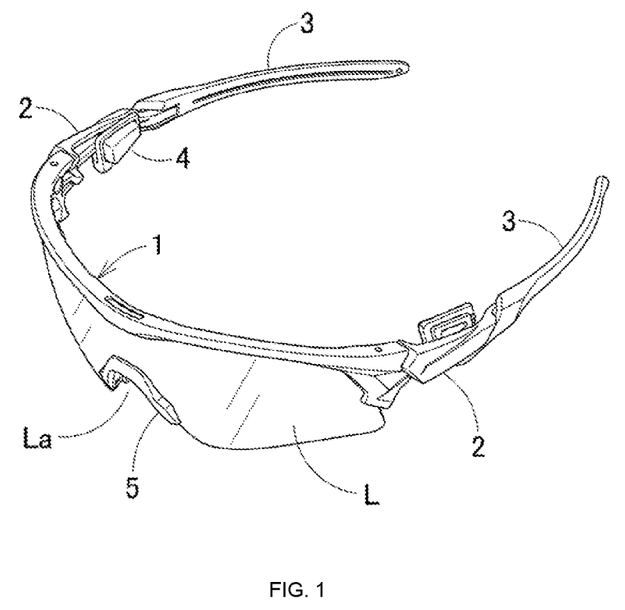
FIG. 1 is a perspective view illustrating one embodiment of eyeglasses of the present invention.
Figure 2:
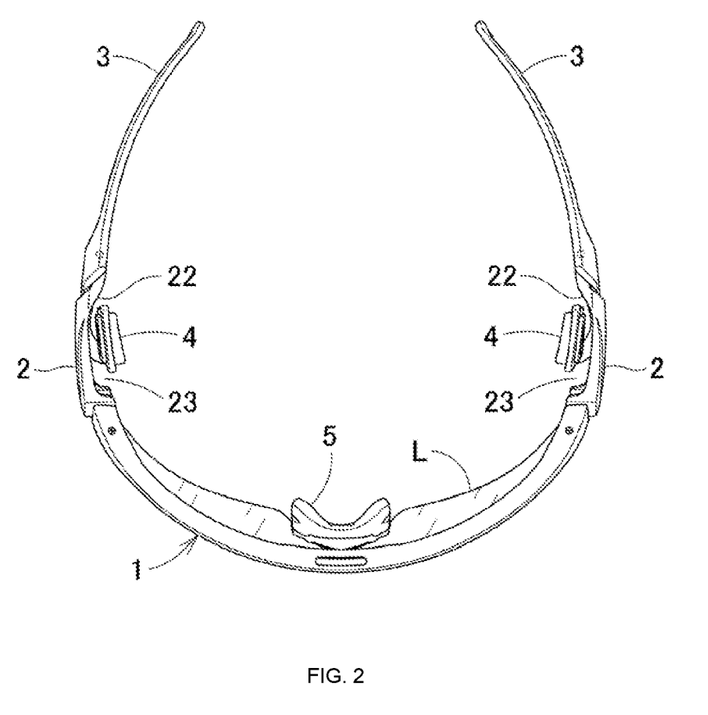
FIG. 2 is a plan view of the eyeglasses of the present invention illustrated in FIG. 1.

As illustrated in FIGS. 1 and 2, the eyeglasses of the present invention include a frame 1, end pieces 2 attached to both end portions of the frame 1, and temples 3 attached to the back ends of the end pieces 2 so as to be swingable in the inward and outward directions. A temple pad 4 protrudes from the front end of the temple 3. The temple pad 4 moves inward when the temple 3 swings outward, and the temple pad 4 moves outward when the temple 3 swings inward.

The end pieces 2 are attached to both end portions of the frame 1 so as to be rotatable or non-rotatable, and a lens L for sunglasses and various types of eyeglasses is fitted into the frame 1. The frame 1 is formed in such shape as to be fitted to a section from the upper edge to both side edges of the lens L but may be formed in such shape as to be fitted only to the upper edge of the lens L or to the entire peripheral edge thereof. The lens L is a single lens but may be a twin lens. A nose pad 5 is attached to the lens L. Note that the nose pad 5 may be attached to the frame 1 as described later.

The end piece 2 is positioned near the temple of the wearer and is preferably a flexible material made of a synthetic resin such as polyamide, polyester, or polycarbonate, or the like.

Figure 3:
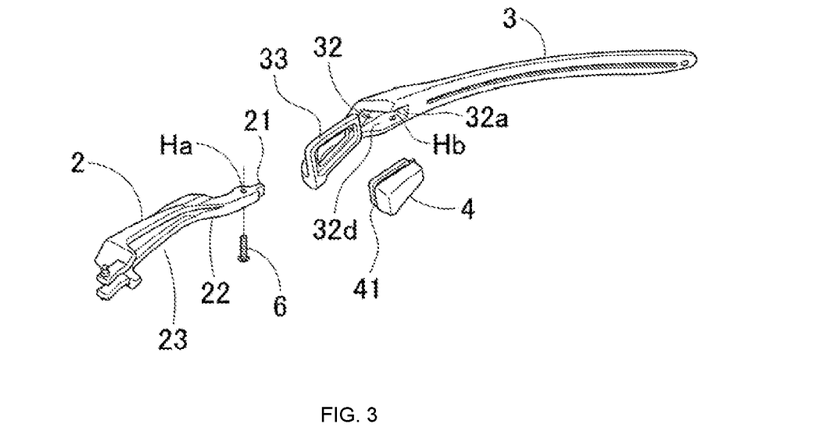
FIG. 3 is an exploded perspective view of an end piece, a temple, and a temple pad in the eyeglasses of the present invention illustrated in FIG. 1.
Figure 5:
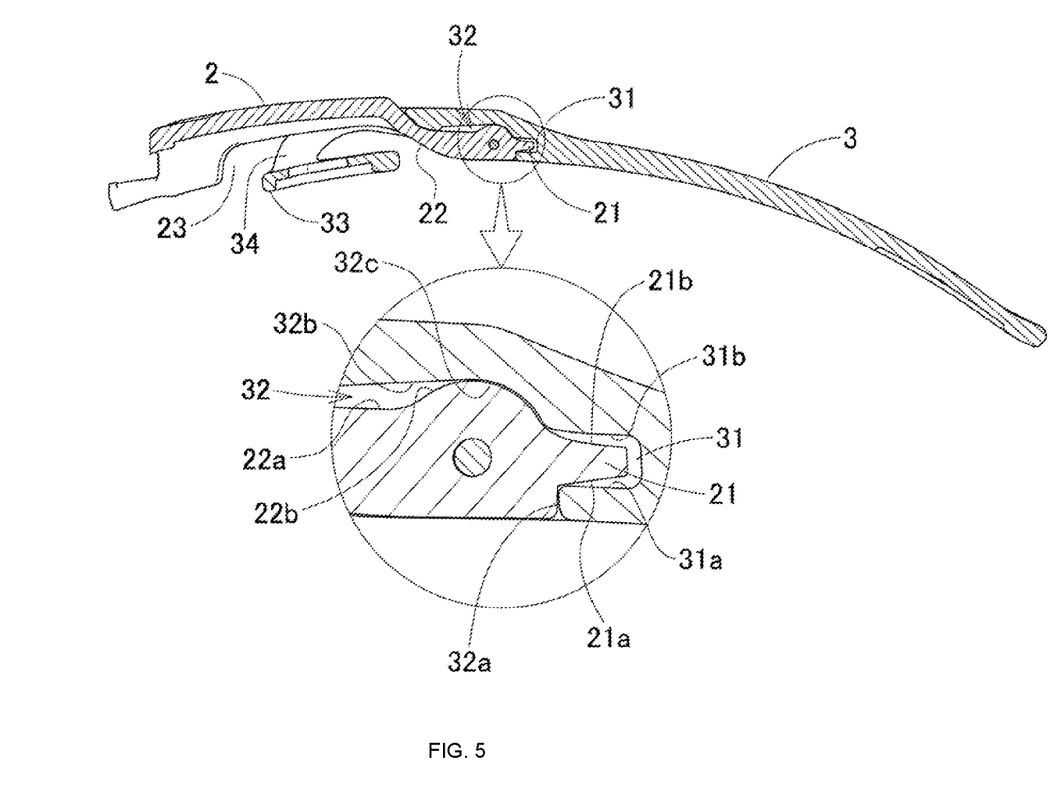
FIG. 5 is a sectional view taken along line A-A in FIG. 4, with the temple pad removed.

The temple 3 is provided along the front, back, and upper parts of the ear of the wearer and is preferably a flexible material made of a synthetic resin or the like, similarly to the end piece 2. The temple 3 can be supported with elasticity from the side to the back of the head of the wearer. As illustrated in FIG. 5, a loosely fitting portion 31 is provided at the front-end portion of the temple 3, and a protrusion 21 provided at the back end of the end piece 2 is loosely fitted to the loosely fitting portion 31. The loosely fitting portion 31 of the temple 3 is recessed in a back wall 32a of a substantially rectangular box-shaped recess 32 having openings on the front and the inner side. The protrusion 21 of the end piece 2 protrudes from the back end of a bent portion 22 formed by bending the back portion of the end piece 2 inward in a substantially doglegged shape in a plan view. Then, a convex curved surface 22b formed on an outer wall 22a of the bent portion 22 of the end piece 2 is provided to follow a concave curved surface 32c formed on an outer wall 32b of the recess 32, and a screw 6 is twisted into a vertical hole Ha formed on the bent portion 22 from a shaft hole Hb formed on a bottom wall 32d of the recess 32 as illustrated in FIG. 3, thereby pivotally supporting the front-end portion of the temple 3 at the back end of the end piece 2. In the loosely fitting portion 31 of the temple 3, the inner and outer sidewalls 21a, 21b of the protrusion 21 of the end piece 2 are caused to face the inner and outer sidewalls 31a, 31b of the loosely fitting portion 31. In this way, when the temple 3 swings, the convex curved surface 22b of the bent portion 22 slides on the concave curved surface 32c of the recess 32, and the inner and outer sidewalls 21a, 21b of the protrusion 21 alternately contact the inner and outer sidewalls 31a, 31b of the loosely fitting portion 31, thereby restricting the swinging of the temple 3. Therefore, when the eyeglasses of the present invention are put on with the frame 1, the end piece 2, and the like pinched by the fingers, the temple 3 does not greatly swing to enter the inside, whereby the temple 3 does not become an obstacle and the eyeglasses can be put on smoothly.

Figure 4:
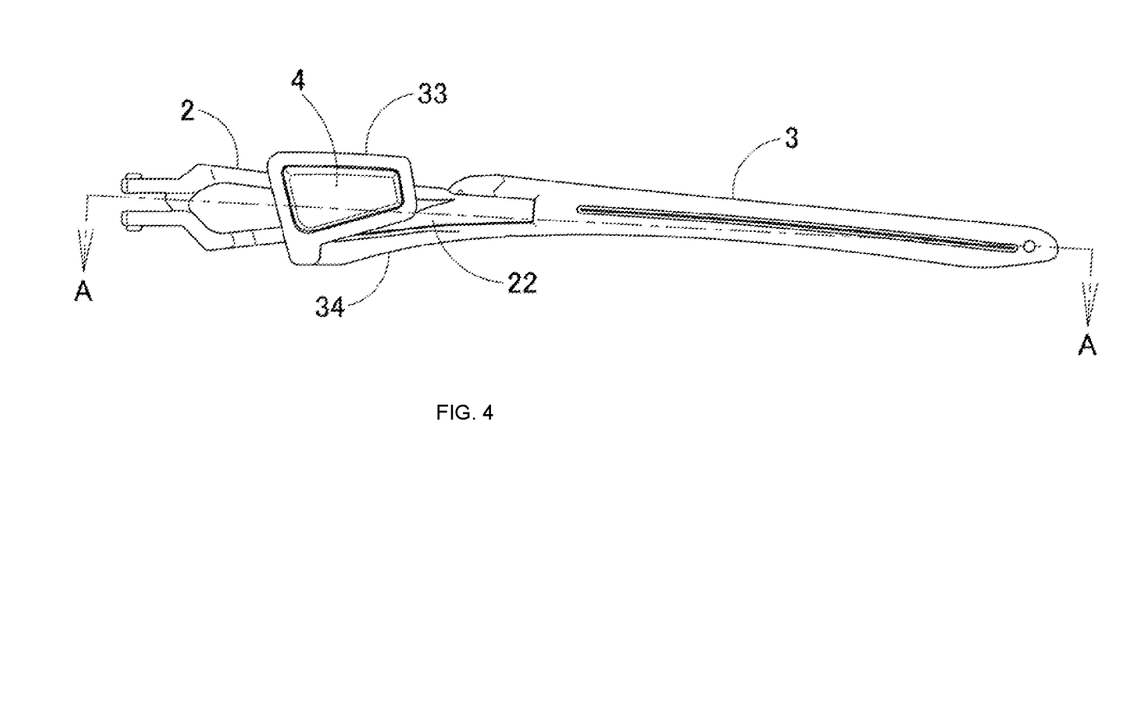
FIG. 4 is a side view of the end piece, the temple, and the temple pad in the eyeglasses of the present invention illustrated in FIG. 1, as viewed from the inside.

Further, as illustrated in FIGS. 3 and 4, a mounting portion 33 of the temple pad 4 is provided at the front end of the temple 3. The mounting portion 33 is provided above a support 34 protruding from the lower portion of the recess 32 formed inside the front end of the temple 3 and is formed in a substantially rectangular frame shape, and the temple pad 4 is detachably attached to the mounting portion 33. Note that similarly to the end piece 2 and the temple 3, the support 34 is also preferably a flexible material made of a synthetic resin or the like.

The temple pad 4 is made of a soft elastic material such as an elastomer or elastic rubber and has a substantially rectangular parallelepiped shape. As illustrated in FIG. 3, the temple pad 4 has a recessed groove 41 formed on the periphery of the temple pad 4 closer to the outer end portion and is attached by the mounting portion 33 being detachably fitted into the recessed groove 41. In this way, the temple pad 4 can be replaced with one with a larger or smaller thickness from the recessed groove 41 to a position near the inner end portion. Note that the thickness can be appropriately selected within a range of 2 to 10 mm.

The temple pad 4 is positioned in front of the bent portion 22 of the end piece 2 so as to enter a space 23 in front of the bent portion 22. In this way, the temple pad 4 does not protrude to the inside of the temple 3, and the temple pad 4 does not become an obstacle when the eyeglasses are put on or not used.

The nose pad 5 is made of a soft elastic material such as an elastomer or elastic rubber, similarly to the temple pad 4, and has a substantially inverted V-shape. In the case of a single lens L, as illustrated in FIG. 1, the nose pad 5 is attached by being fitted detachably or non-detachably into a substantially inverted V-shaped cut portion La formed at the center of the lower side portion of the lens L. When the entire peripheral edge of the lens L is fitted in the frame 1, the nose pad 5 may be attached detachably or non-detachably to a substantially inverted V-shaped cut portion (not illustrated) formed at the center of the lower side portion of the frame 1.

Figure 6A:
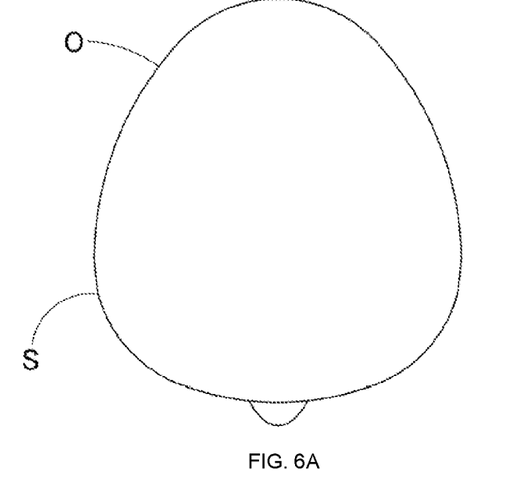
FIGS. 6A and 6B are schematic views illustrating a positional relationship between the temple and a temple pad when a wearer with the head having an egg shape puts on the eyeglasses of the present invention.
Figure 6B:
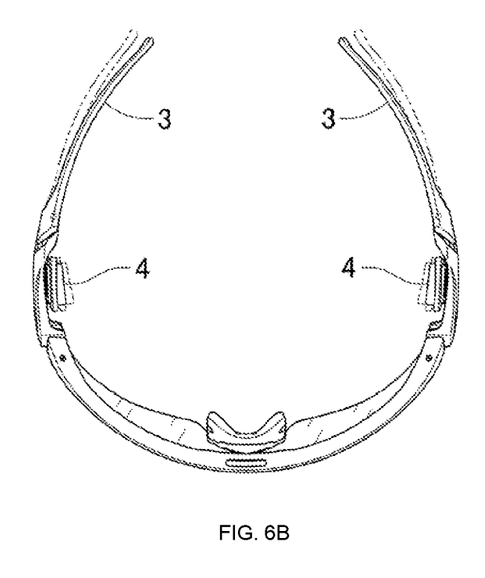

According to the eyeglasses of the present invention configured as described above, when a wearer with the head having an egg shape puts on the eyeglasses, since a back head O is thin as illustrated in FIG. 6A, the temple 3 swings inwardly along the back head O as illustrated in FIG. 6B, and since a side head S is wide, the temple pad 4 moves outwardly along the side head S, so that the eye glasses fit the wearer with the head having the egg shape.

Figure 7A:
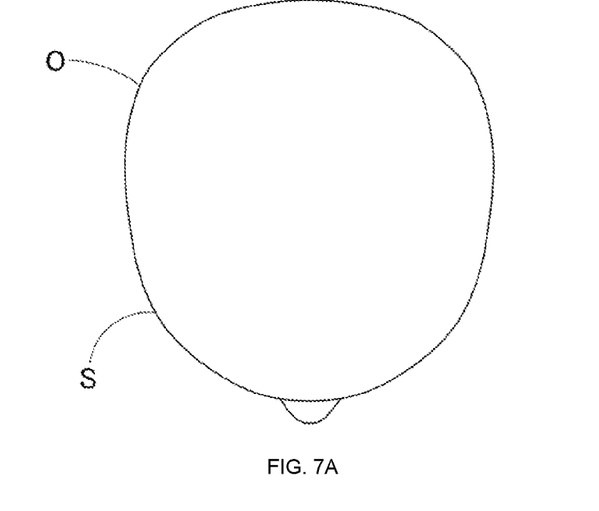
FIGS. 7A and 7B are schematic views illustrating a positional relationship between the temple and the temple pad when a wearer with the head having an inverted egg shape puts on the eyeglasses of the present invention.
Figure 7B:
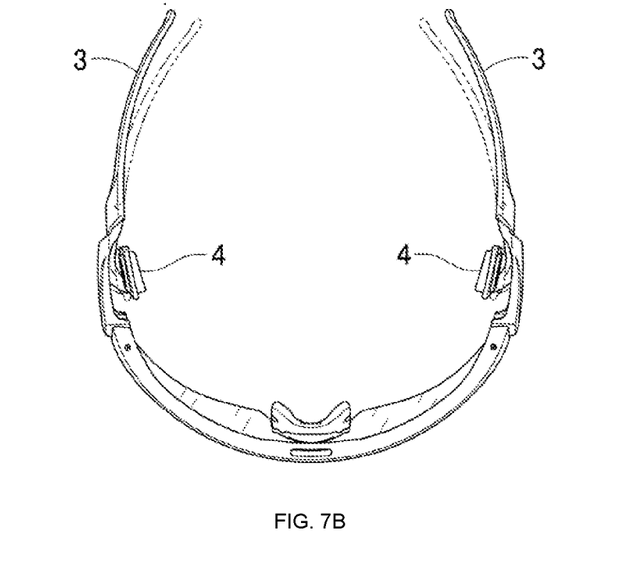

When a wearer with the head having an inverted egg shape puts on the eyeglasses of the present invention, because a back head O is wide as illustrated in FIG. 7A, the temple 3 swings outwardly along the back head O as illustrated in FIG. 7B, and because the side head S is thin, the temple pad 4 moves inwardly along the side head S, so that the eye glasses fit the wearer with the head having the inverted egg shape.

Also, when a wearer with the head having a shape in which the back and side of the head are generally thin, or a round shape, puts on the eyeglasses of the present invention, the temple 3 and the temple pad 4 move along the back and side of the head, so that the eyeglasses fit the wearer with the above head shape.

Therefore, the eyeglasses of the present invention can be supported so as to fit each of various head shapes of wearers without any gap, the head shapes being an egg shape, an inverted egg shape, a shape in which the back and side of the head are generally thin, a round shape, and the like. Thus, the eyeglasses are extremely excellent in preventing slippage and falling during exercise and have a good fitting feeling.

The eyeglasses of the present invention can support the side of the head and the temple of the wearer with elasticity when the end piece 2, the temple 3, and the support 34 of the mounting portion 33 of the temple pad 4 have flexibility, and hence the eyeglasses can be supported so as to further fit each of various head shapes of wearers, such as an egg shape, an inverted egg shape, a shape in which the back and side of the head are generally thin, and a round shape without any gap.

When the temple pad 4 is detachably attached in the eyeglasses of the present invention, replacement of the temple pad 4 with a thicker or a thinner one enables the eyeglasses to be supported so as to further fit each of various head shapes of wearers as described above without any gap.

The eyeglasses of the present invention, with the nose pad 5 attached to the frame 1 or the lens L, are supported at five points by the nose pad 5, the temples 3, and the temple pads 4, so that the eyeglasses further fit the head shape of the wearer without any gap and are supported in a more stable state.

Further, by simply putting on the eyeglasses of the present invention, the temple 3 and the temple pad 4 swing, and the eyeglasses can be supported so as to fit each of various head shapes of wearers without any gap, thereby not particularly requiring an adjustment operation for preventing slippage and falling.

REFERENCE SIGNS LIST 1 frame
2 end piece
3 temple
4 temple pad
5 nose pad
21 protrusion
21a inner sidewall
21b outer sidewall
31 loosely fitting portion
31a inner sidewall
31b outer sidewall
32 recess
33 mounting portion
34 support
L lens

What is claimed is:

1. Eyeglasses comprising:
a frame;
end pieces attached to both end portions of the frame; and
temples attached to back ends of the end pieces so as to be swingable in inward and outward directions,
wherein:
the temple is oriented to be positioned from the front to back, and along the upper parts, of an ear of a person wearing the eyeglasses,
a temple pad protrudes from a front end of each of the temples, the front end of each of the temples being proximate each end piece,
the temple pad moves inward when the temple swings outward,
the temple pad moves outward when the temple swings inward,
a loosely fitting portion is provided at a front-end portion of the temple,
a protrusion provided at a back end of each of the end pieces is loosely fitted to the loosely fitting portion, and
swinging of the temple is restricted by contact of inner and outer sidewalls of the protrusion with inner and outer sidewalls of the loosely fitting portion.

2. The eyeglasses according to claim 1, wherein the temple pad is detachably attached to a mounting portion provided on a support protruding from the front end of the temple.

3. The eyeglasses according to claim 2, wherein the end piece, the temple, and the support protruding from the front end of the temple have flexibility.

4. The eyeglasses according to claim 1, wherein a nose pad is attached to the frame or a lens attached to the frame.

5. Eyeglasses comprising:
a frame;
end pieces attached to both end portions of the frame; and
temples attached to back ends of the end pieces so as to be swingable in inward and outward directions,
wherein:
the temple is oriented to be positioned from the front to back, and along the upper parts, of an ear of a person wearing the eyeglasses,
a temple pad protrudes from a front end of each of the temples, the front end of each of the temples being proximate each end piece,
the temple pad moves inward when the temple swings outward,
the temple pad moves outward when the temple swings inward, and
a nose pad is attached to the frame or a lens attached to the frame.

6. The eyeglasses according to claim 5, wherein the temple pad is detachably attached to a mounting portion provided on a support protruding from the front end of the temple.

7. The eyeglasses according to claim 5, wherein the end piece, the temple, and the support protruding from the front end of the temple have flexibility.

* * * * *